(12) United States Patent
Schlossmacher et al.

(10) Patent No.: US 8,303,313 B2
(45) Date of Patent: Nov. 6, 2012

(54) BREADBOARD FOR MOUNTING COMPONENTS

(75) Inventors: Wolfram Schlossmacher, Unterschleissheim (DE); Ralf-Rainer Rohloff, Weinheim (DE)

(73) Assignees: Max-Planck-Gesellschaft zur Foerderung der Wissenschaften, e.V., Munich (DE); Wolfram Schlossmacher, Unterschleissheim (DE)

( * ) Notice: Subject to any disclaimer, the term of this patent is extended or adjusted under 35 U.S.C. 154(b) by 145 days.

(21) Appl. No.: 12/936,560

(22) PCT Filed: Mar. 30, 2009

(86) PCT No.: PCT/EP2009/002316
§ 371 (c)(1),
(2), (4) Date: Oct. 6, 2010

(87) PCT Pub. No.: WO2009/124673
PCT Pub. Date: Oct. 15, 2009

(65) Prior Publication Data
US 2011/0028007 A1 Feb. 3, 2011

(30) Foreign Application Priority Data
Apr. 8, 2008 (EP) .................................... 08006975

(51) Int. Cl.
*H01R 29/00* (2006.01)
*H02B 1/056* (2006.01)
(52) U.S. Cl. .......................................... 439/43; 439/55
(58) Field of Classification Search .................... 439/43, 439/50, 55; 156/252
See application file for complete search history.

(56) References Cited

U.S. PATENT DOCUMENTS

| | | | |
|---|---|---|---|
| 5,433,302 A | 7/1995 | Heide | |
| 5,994,640 A | 11/1999 | Bansemir et al. | |
| 6,313,959 B1 | 11/2001 | Rotella et al. | |
| 6,483,530 B2 | 11/2002 | Wilson | |
| 7,011,793 B2 * | 3/2006 | Zhou et al. | 422/503 |
| 2002/0080229 A1 | 6/2002 | Wilson | |
| 2003/0082315 A1 | 5/2003 | Mehlman et al. | |
| 2005/0249476 A1 | 11/2005 | Herren et al. | |
| 2011/0008974 A1 * | 1/2011 | Salomie | 439/55 |

FOREIGN PATENT DOCUMENTS
DE 4439159 A1 5/1996
(Continued)

OTHER PUBLICATIONS

Catanzaro et al., "Carbon Fiber Composite Photomask Stage Component", Part of the SPIE Conference on Composite Materials and Applications, Denver, Colorado, pp. 206-214 (1999).

(Continued)

*Primary Examiner* — Hae Moon Hyeon
(74) *Attorney, Agent, or Firm* — Caesar, Rivise, Bernstein, Cohen & Pokotilow, Ltd.

(57) ABSTRACT

The invention relates to a breadboard (1) for mounting components, particularly optical components, comprising an upper panel (2) for mounting the components on top of the upper panel (2), a lower panel (3) being arranged substantially parallel to the upper panel (2) at a specified distance below the upper panel (2) and at least one spacer (4) being arranged between the upper panel (2) and the lower panel (3), wherein the spacer (4) essentially consists of a fiber-reinforced material. Further, the invention relates to a method for manufacturing such a breadboard (1). Vibration damping means and fixing elements (5) for fixing components to the panels are disclosed.

11 Claims, 7 Drawing Sheets

FOREIGN PATENT DOCUMENTS

EP        0596600 A1    5/1994
EP        1593951 A2    11/2005

OTHER PUBLICATIONS

Graue et al., "DIVA Optical Telescope", Proceedings of SPIE, vol. 4854, pp. 9-20 (2003).

Newport Corporation, "Newport Resource 2003 Catalogue", pp. 1202-1203 (2003).

Papenburg et al., "Optical and Optomechanical Ultra-lightweight C/SiC®* Components", Part of the SPIE Conference on Optical Manufacturing and Testing III, Denver, Colorado, pp. 141-156 (1999).

Rohloff et al., "CFRP structure for the LBT instrument LINC-NIR-VANA", Proc. of SPIE, vol. 6273, pp. 62730Z-1 to 62730Z-12 (2006).

Skullney et al., "Structural Design of the MSX Spacecraft", Johns Hopkins APL Technical Digest, vol. 17, pp. 59-76 (1996).

Wingate et al., "An ultra stable optical bench for the magnetic survey satellite", Acta Astronautica, vol. 7, pp. 1389-1401 (1980).

International Search Report for PCT/EP2009/002316.

* cited by examiner

BREADBOARD FOR MOUNTING COMPONENTS

FIELD OF THE INVENTION

The invention relates to a breadboard for mounting components, particularly optical components.

BACKGROUND OF THE INVENTION

Breadboards are used for setting up optical experiments or other laboratory experiments in which the position and alignment of the components mounted on the breadboard must be extremely accurate since even small position inaccuracies or geometrical displacements caused by vibrations or thermal strain in the breadboard can lead to a complete failure of an experiment. The conventional breadboards generally consist of two parallel steel panels with a steel honeycomb structure being sandwiched between the steel panels. The honeycomb structure provides a high mechanical stiffness thereby avoiding bending of the breadboard and a misalignment of the components on the breadboard.

One disadvantage of the conventional steel breadboards mentioned above is the high weight.

A further disadvantage of the conventional breadboards is the unsatisfying accuracy with regard to the positioning of the optical components which are mounted onto the breadboard. The unsatisfying accuracy is caused by the typically applied manufacturing technologies and by thermal expansion of the steel panels and the steel honeycomb structure. Further, an optical table is disclosed in ROHLOFF, Ralf Rainer et al.: "CFRP structure for the LBT instrument LINC-NIRVANA", Optomechanical Technologies for Astronomy, 2006, Vol. 6273, 1-12. The optical table disclosed in this publication comprises two parallel flat panels made of carbon fiber-reinforced plastics (CFRP) and an Aluminum honeycomb structure sandwiched between the CFRP panels. However, the Aluminum honeycomb structure also results in a high weight of the optical table.

SUMMARY OF THE INVENTION

Therefore, it is an object of the invention to provide an improved breadboard having an improved accuracy, a lower weight, a better vibrational damping characteristic and thermal stability with regard to the positioning of the components on the breadboard.

Further, it is an object of the invention to provide a method for manufacturing such a breadboard.

These objects are achieved by a breadboard and a corresponding method of manufacturing according to the independent claims.

The invention includes the general teaching to use a fiber-reinforced material (e.g. CFRP) for the spacer (e.g. a honeycomb structure) which is sandwiched between the upper panel and the lower panel of the breadboard.

The panels of the breadboard can have a thickness in a range between 1 mm and 5 mm although the invention is not restricted to this parameter range.

In one embodiment of the invention, the breadboard comprises just two panels, namely an upper panel and a lower panel, wherein the spacer (i.e. hollow tubes) is sandwiched between the two panels.

In another embodiment of the invention, the breadboard comprises three panels, namely the upper panel, the lower panel and an intermediate panel being arranged between the upper panel and the lower panel. In this embodiment, there is at least one spacer both between the upper panel and the intermediate panel and between the intermediate panel and the lower panel.

In other words, the breadboard according to the invention is not restricted to a specific number of parallel panels which are interconnected by the fiber-reinforced spacers.

The spacers between the adjacent panels of the breadboard are hollow tubes which are aligned substantially perpendicular to the adjacent panels.

In a preferred embodiment of the invention, at least one of the panels is a sandwich panel comprising an upper layer, a lower layer and an intermediate layer being sandwiched between the upper layer and the lower layer, wherein the intermediate layer is damping mechanical vibrations stronger than the upper layer and the lower layer. For example, the upper layer and the lower layer can be thin CFRP plates, wherein the intermediate layer can be a foil consisting of a viscoelastic damping polymer, e.g. the viscoelastic damping polymer sold by the company 3M™ under the trademark 110™.

The vibration damping intermediate layer of the panels can have a thickness in a range between 0.1 mm and 2 mm although the invention is not restricted to this parameter range.

Further, the upper and lower layer of the sandwich structure of the panels can have a thickness in a range between 1 mm and 5 mm although the invention is not restricted to this parameter range.

The breadboard comprises several fixing elements (e.g. knurled screws having an inner thread for mounting the components) for fixing the components to the top side of the upper panel of the breadboard. In one embodiment of the invention, the breadboard also comprises several fixing elements on the lower panel for fixing the components to the bottom side of the lower panel. Therefore, the breadboard may be adapted either for a one-sided mounting of the components or for a double-sided mounting of the components.

The fixing elements are adhered to the upper panel and the lower panel, respectively.

Further, the fixing elements are adhered to the spacers, as well. This is advantageous since it provides two adhesive joints taking forces in different directions thereby improving the rigidity of the breadboard.

Further, the fixing elements are preferably raised relative to the top side of the upper panel thereby avoiding a contamination of the fixing elements and of the inner components of the breadboard.

In a preferred embodiment of the invention, the fixing elements each consist of a screw, particularly a knurled screw having an internal thread for receiving an attachment screw of the corresponding component. Therefore, the components can be mounted on the breadboard by screwing the attachment screws of the components into the internal threads of the fixing elements.

Further, the fixing elements of the breadboard preferably comprise a top surface which is leveled out by grinding or milling the top surface of the fixing elements so that the accuracy of position in a vertical direction is improved.

It has already been mentioned that the spacers between the adjacent panels are hollow tubes in contrast to a conventional honeycomb structure. In such a case there are preferably several spacers (e.g. tubes) which are spatially distributed between the upper panel and the lower panel, wherein the spacers each connect the upper panel to the lower panel, e.g. by bonding the spacer to a fixing element.

In this embodiment of the invention, the individual spacers can have different vibration characteristics, which can be adapted to the vibration characteristics of the components which are mounted on the breadboard so that the overall vibration behaviour of the breadboard with the mounted components is improved.

In a preferred embodiment of the invention, the upper panel comprises a grid of fixing elements for fixing the components (e.g. optical components) to the upper panel, wherein the individual components on the breadboard have different vibration characteristics, i.e. different amplitudes and/or different frequency spectra. Further, there is a grid of spacers between the upper panel and the lower panel, so that each of the components corresponds to one or more of the fixing elements and one or more of the spacers. In this embodiment, the spacers have different vibration characteristics, wherein the vibration characteristics of the spacers are adapted to the vibration characteristics of the corresponding components in such a way that the mechanical vibrations of the breadboard are positively effected, particularly by minimizing the amplitude of the displacement. In this embodiment, the vibration characteristics of the individual spacers are adjusted in accordance to the vibration characteristics of the components on the breadboard so that the overall vibration behaviour of the breadboard is improved.

The hollow tubes are open at their lower end, so that the hollow tubes are each forming a passage for dirt.

The fixing elements (e.g. knurled screws) preferably each comprises a head resting on the top side of the upper panel, wherein the bottom side of the head is adhered to the top side of the upper panel. Further, the fixing elements each comprise a shaft which is introduced into the hollow tubes, wherein the outer peripheral surface of the shaft of the fixing elements is adhered to the inner surface of the tubes. In other words, the fixing elements are not only adhered to the upper panel of the breadboard but also to the hollow tubes, which improves the rigidity of the breadboard.

It has already been mentioned that the vibration characteristics of the spacers (e.g. hollow tubes) can be adjusted according to the vibration characteristics of the components on the breadboard. This adjustment can be achieved by additional damping elements which are attached to the spacers. For example, the damping elements can be conventional viscous dampers, which are inserted into the hollow tubes. Further, the vibration characteristics of the spacers can be adjusted by additional vibration masses which are attached to the individual spacers.

In the aforementioned embodiment of the invention using hollow tubes between the adjacent panels, the interspace between the adjacent panels is generally hollow. Therefore, the interspace between the adjacent panels can be laterally covered by a side wall. However, it is alternatively possible to leave the interspace between the adjacent panels laterally uncovered.

A major advantage of the breadboard of the invention is the improved accuracy by a higher thermal stability with regard to the positioning of e.g. optical components on the breadboard which is caused by the lower thermal expansion of CFRP in comparison to steel which is conventionally used for manufacturing the honeycomb structure of the breadboard. Therefore, the upper panel, the lower panel, the intermediate panel and/or the spacer(s) preferably consist of a material comprising a thermal expansion coefficient of less than $10 \cdot 10^{-6} K^{-1}$, $2 \cdot 10^{-6} K^{-1}$ or $1 \cdot 10^{-6} K^{-1}$.

Further, the components on the breadboard preferably have a lateral and/or vertical misalignment of less than 100 μm or less than 50 μm.

Moreover, the breadboard according to the invention preferably comprises a lateral extension of more than 20 cm, 50 cm, 1 m, 2 m or 3 m. These relatively huge dimensions of the breadboard are made possible by the rigidity and low weight of CFRP.

Further, the breadboard is preferably flat thereby providing a planar top side and/or a planar bottom side so that the components can be arranged in a common plane. Alternatively, the breadboard can have a freeform with curved surfaces.

Moreover, due to its lower weight the breadboard can be more easily arranged horizontally, vertically or at any angle with regard to the force of gravity.

It should further be noted, that the invention is not restricted to a breadboard without the components (e.g. optical components). Moreover, the invention also refers to a breadboard arrangement comprising the aforementioned breadboard along with several optical, mechanical, electrical and/or electronic components which are mounted onto the breadboard.

Further, the invention also comprises a method for manufacturing such a breadboard wherein the spacer(s) between the adjacent panels is fiber-reinforced.

Further, the invention preferably uses a special technique for attaching the fixing elements to the breadboard. This technique comprises the step of drilling bores to the breadboard, wherein the holes have an oversize in relation to the shaft of the fixing elements. Then, the fixing elements are inserted into the bores at the top side of the breadboard and/or at the bottom side of the breadboard. Due to the oversize of the bores, the fixing elements can be repositioned laterally within the bores. In a next step, a template is applied for adjusting the lateral and/or vertical position of the fixing elements within the bores, wherein the template defines the lateral position of the fixing elements on the breadboard.

Further, the fixing elements are preferably leveled out by grinding or milling the top surface of the fixing elements. Before this step, a reference plane is preferably generated by levelling out base elements at the bottom side of the breadboard, which can be accomplished by grinding or milling the top surface of the base elements.

The base elements represent the interface of the breadboard to adjacent structures.

DETAILED DESCRIPTION OF THE DRAWINGS

Figure 1A:
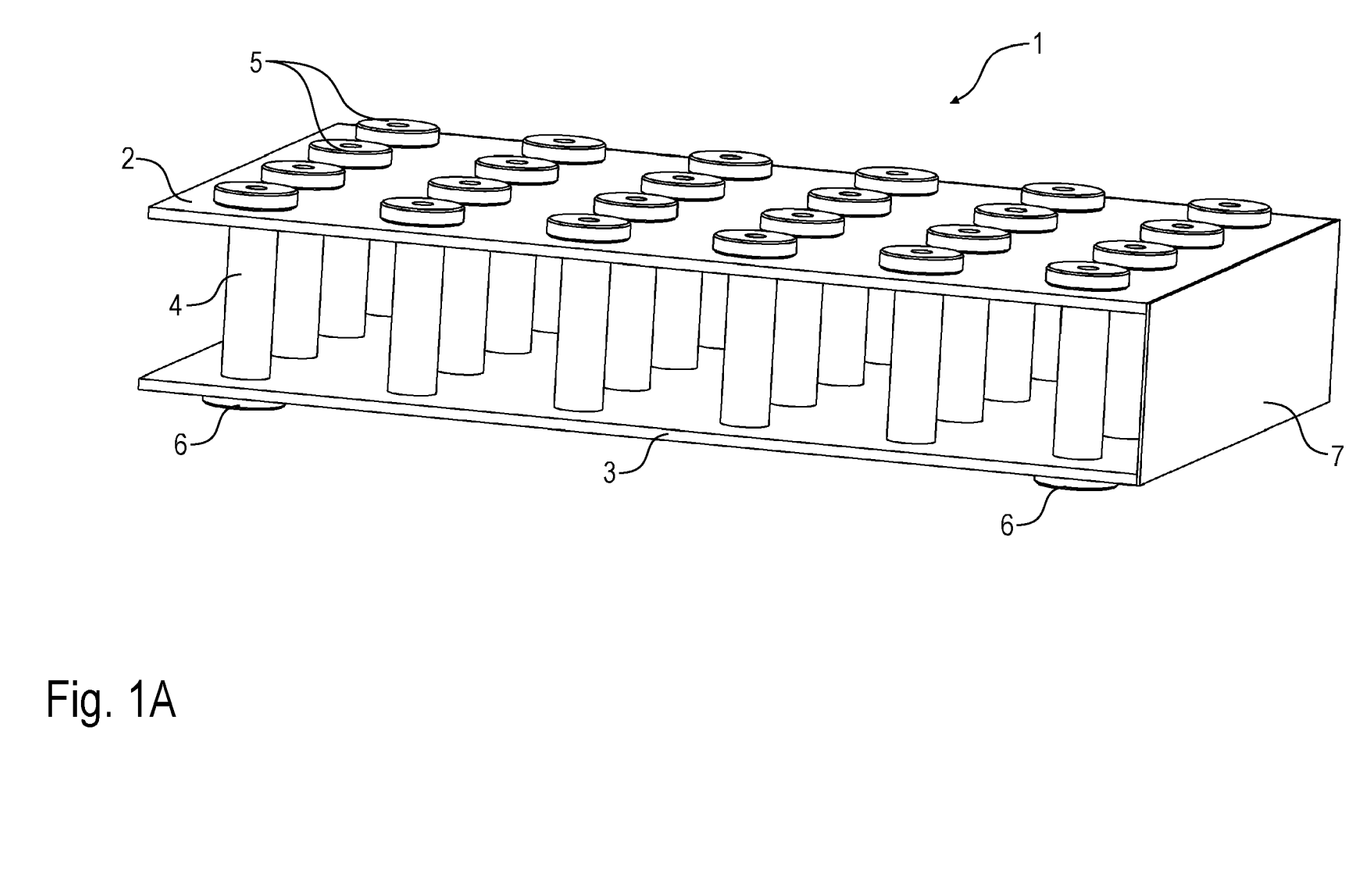
FIG. 1A shows a perspective view of a breadboard according to the invention for mounting optical components.
Figure 1B:
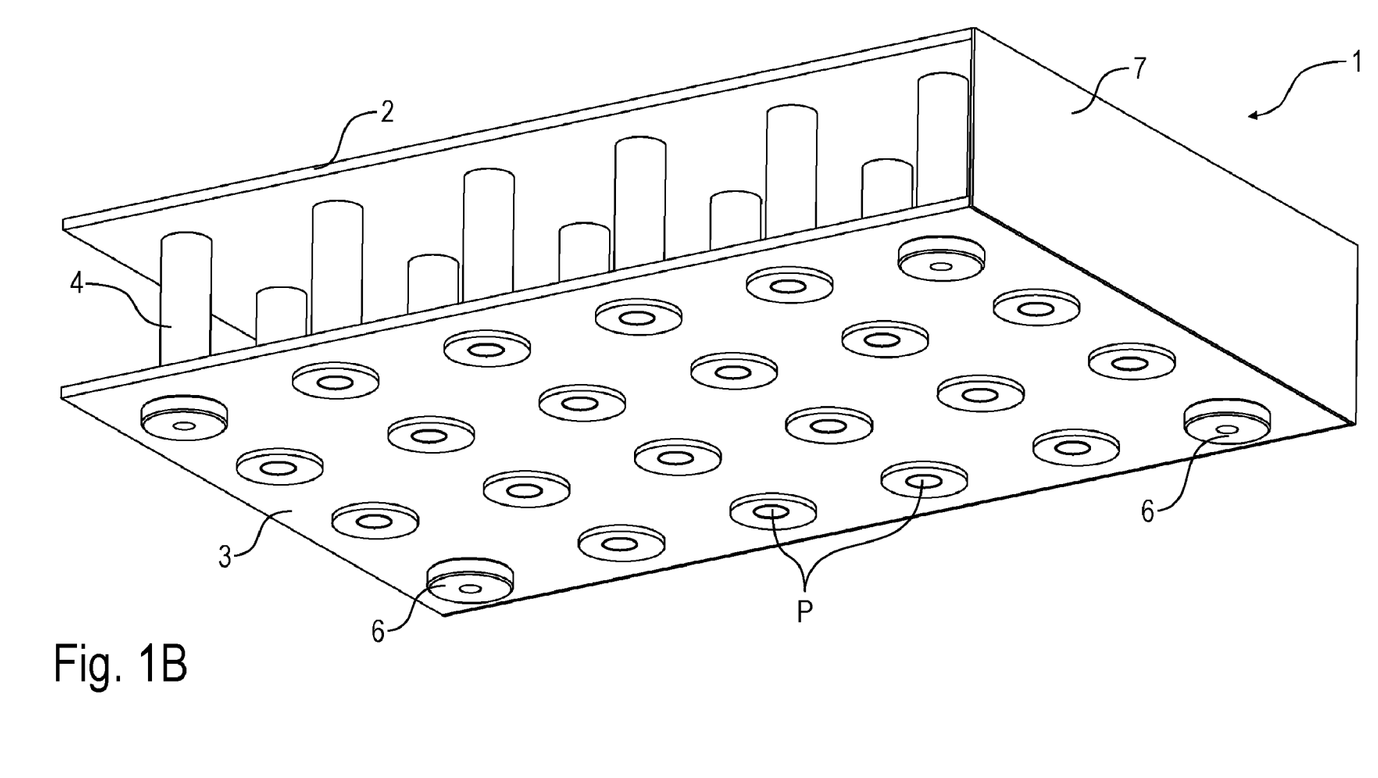
FIG. 1B shows another perspective view of the breadboard from the bottom.
Figure 1C:
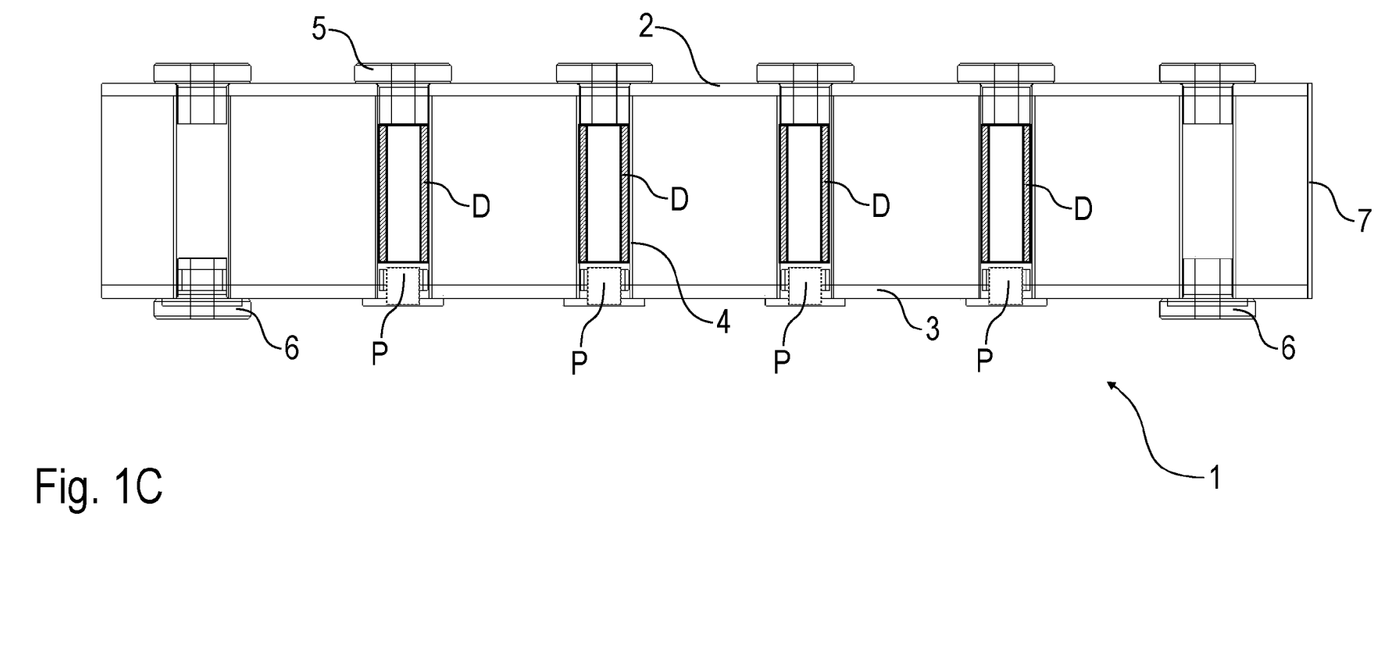
FIG. 1C shows a cross-section of the breadboard according to FIGS. 1A and 1B.

In the following, reference is made to FIGS. 1A-1C showing a first embodiment of a breadboard 1 which can be used, for example, for mounting optical components.

The breadboard 1 comprises an upper panel 2 and a lower panel 3 both being plate-shaped and consisting of carbon-fiber reinforced plastics (CFRP). The upper panel 2 and the lower panel 3 each have a thickness of 3.2 mm although other values are possible for the thickness of the upper panel 2 and the lower panel 3.

The upper panel 2 and the lower panel 3 are aligned parallel to each other and mechanically interconnected by several spacers 4 each consisting of a hollow tube made of CFRP.

At the top side of the breadboard, several fixing elements 5 in the form of e.g. knurled screws are arranged for mounting optical components or other components to the breadboard 1.

The fixing elements 5 each have an inner thread so that the optical components can be screwed into the inner thread of the fixing elements 5.

Further, the fixing elements 5 each comprise a head resting on the top side of the upper panel 2, wherein the head of the fixing elements 5 is adhered to the top side of the upper panel 2.

Moreover, the fixing elements 5 each comprise a shaft (not visible in FIGS. 1A-1B), which is introduced into the spacers 4, wherein the outer peripheral surface of the shafts of the fixing elements 5 is adhered to the inner surface of the tube-shaped spacers 4.

Therefore, the fixing elements 5 are adhered to the breadboard 1 in two different ways which improves the rigidity of the breadboard 1.

At the bottom side of the breadboard 1, there are four base elements 6 in the corners of the lower panel 3. The base elements 6 serve as supporting points and jointly define a reference plane for the fixing elements 5. Therefore, the base elements 6 are leveled out by grinding or milling the base elements 6 to define a high-accuracy reference plane. Then, the fixing elements 5 at the top side of the breadboard 1 are leveled out by grinding or milling the top surface of the fixing elements 5.

It should further be noted that the inter space between the upper panel 2 and the lower panel 3 is hollow and can be—as an option—laterally covered by side wall 7.

One advantage of the breadboard 1 is the low weight compared with conventional breadboards made of steel since CFRP has a much lower density than steel at comparable strength.

Another advantage of the breadboard 1 is the improved thermal stability since the CFRP used for manufacturing the upper panel 2, the lower panel 3 and the spacers 4 comprise a thermal expansion coefficient close to zero. Therefore, the accuracy of the positioning of the fixing elements 5 and therefore also the accuracy of the positioning of the optical components on the breadboard 1 is not affected by thermal effects.

Figure 1D:
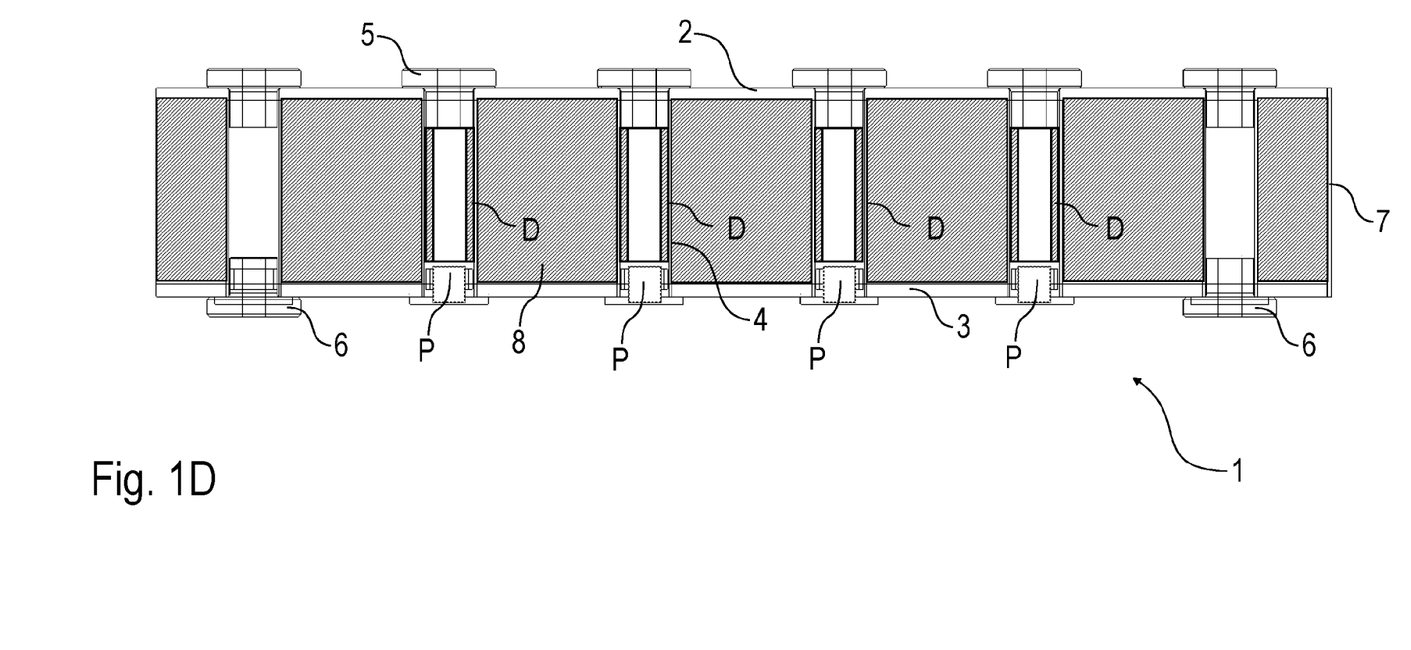
FIG. 1D shows a cross-section of the breadboard additionally comprising a honeycomb structure.

FIG. 1D shows a cross-section of another embodiment of the invention which is similar to the embodiment according to FIGS. 1A-1C so that reference is made to the above description.

One distinctive feature of this embodiment is that there is a honeycomb structure 8 between the upper panel 2 and the lower panel 3, wherein the honeycomb structure 8 surrounds the spacers 4. The honeycomb structure 8 additionally provides stiffness to the breadboard 1.

It has already been mentioned that the vibration characteristics of the spacers 4 (i.e. hollow tubes) can be adjusted according to the vibration characteristics of the components on the breadboard. This adjustment is achieved by additional damping elements D which are inserted into the hollow tubes. Further, the hollow tubes are open at their lower end, so that the hollow tubes are each forming a passage for dirt.

Further, FIGS. 1B-1D show that the hollow tubes are open at their lower end so that the hollow tubes are each forming a passage P for dirt.

Figure 2A:
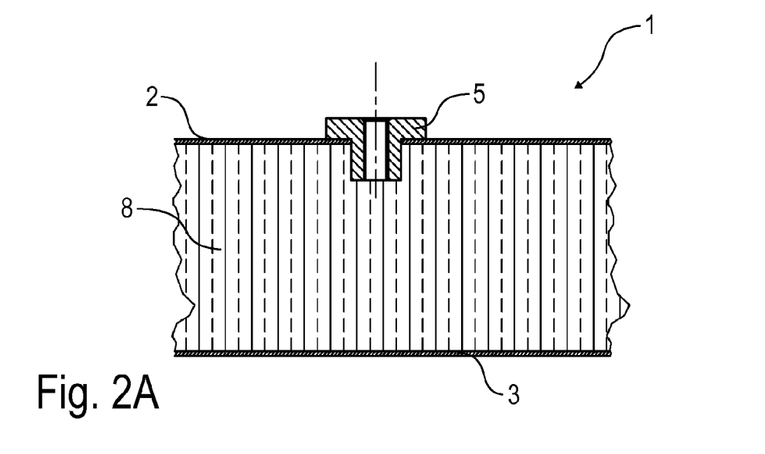
FIGS. 2A-2C illustrate the high-accuracy positioning of fixing elements in the breadboard using a template.
Figure 2B:
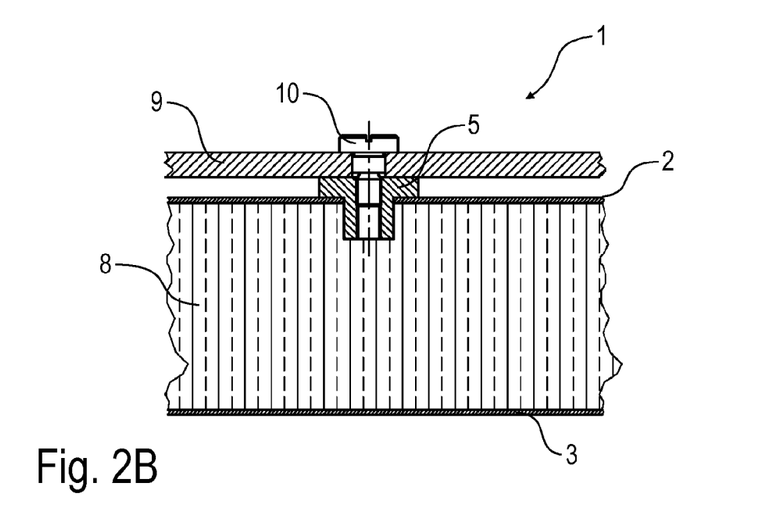
Figure 2C:
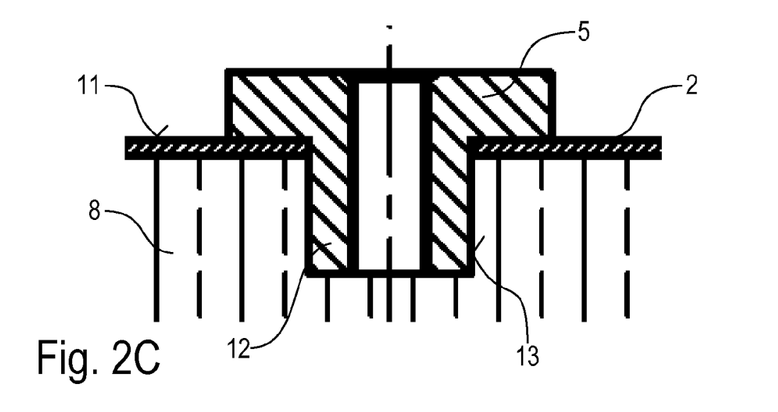

Reference is now made to FIGS. 2A-2C illustrating the high-accuracy positioning of the fixing elements 5 in the breadboard 1. For purposes of illustration, the tube-shaped spacers 4 are not shown so that there is merely the honeycomb structure 8 between the upper panel 2 and the lower panel 3 of the breadboard 1.

Firstly, blind bores are drilled into the breadboard 1 for receiving the fixing elements 5. It has to be noted that these bores have an oversize in relation to the fixing elements 5 so that the fixing elements 5 can still be laterally repositioned within the bores.

Then, a template 9 is positioned above the breadboard 1, wherein the template 9 comprises a number of bores defining the desired position of the fixing elements 5 on the breadboard 1.

In a next step, shouldered screws 10 are inserted through the bores in the template 9 and screwed into the internal threads of the fixing elements inserted in the upper panel 2 thereby precisely positioning the fixing elements 5.

Then, the fixing elements 5 are adhered to the upper panel 2 in two different ways.

Firstly, the bottom side of the head of the fixing elements 5 is adhered to the top side of the upper panel 2.

Further, the fixing elements 5 comprise a shaft 12 having an outer peripheral surface 13 which is adhered to the honeycomb structure 8.

Finally, the screws 10 are released and the template 9 is removed from the breadboard 1.

Figure 3:
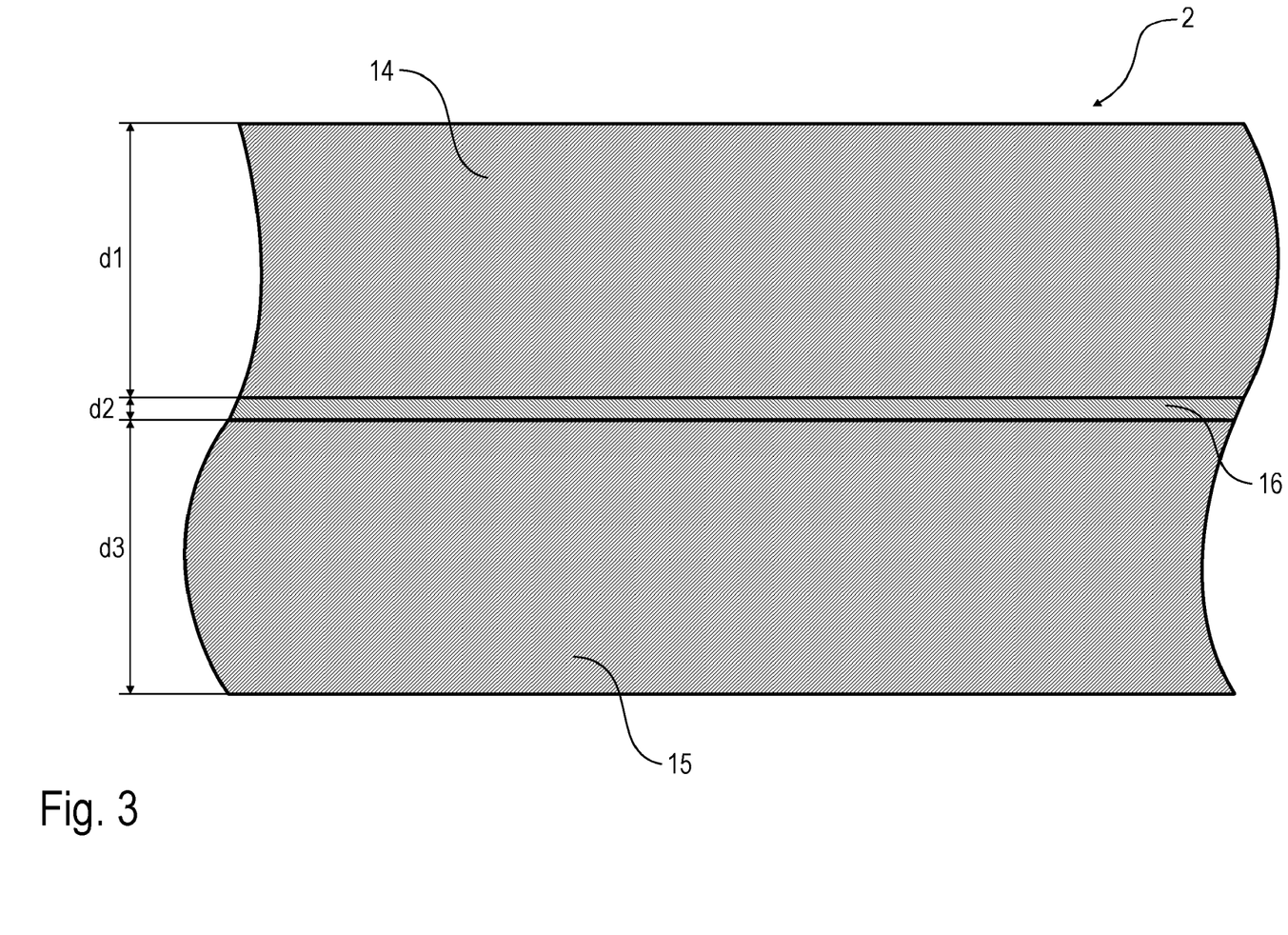
FIG. 3 shows a cross section of a panel of the breadboard in the form of a sandwich arrangement consisting of two CFRP layers and a vibration damping foil being sandwiched between both layers.
Figure 4:
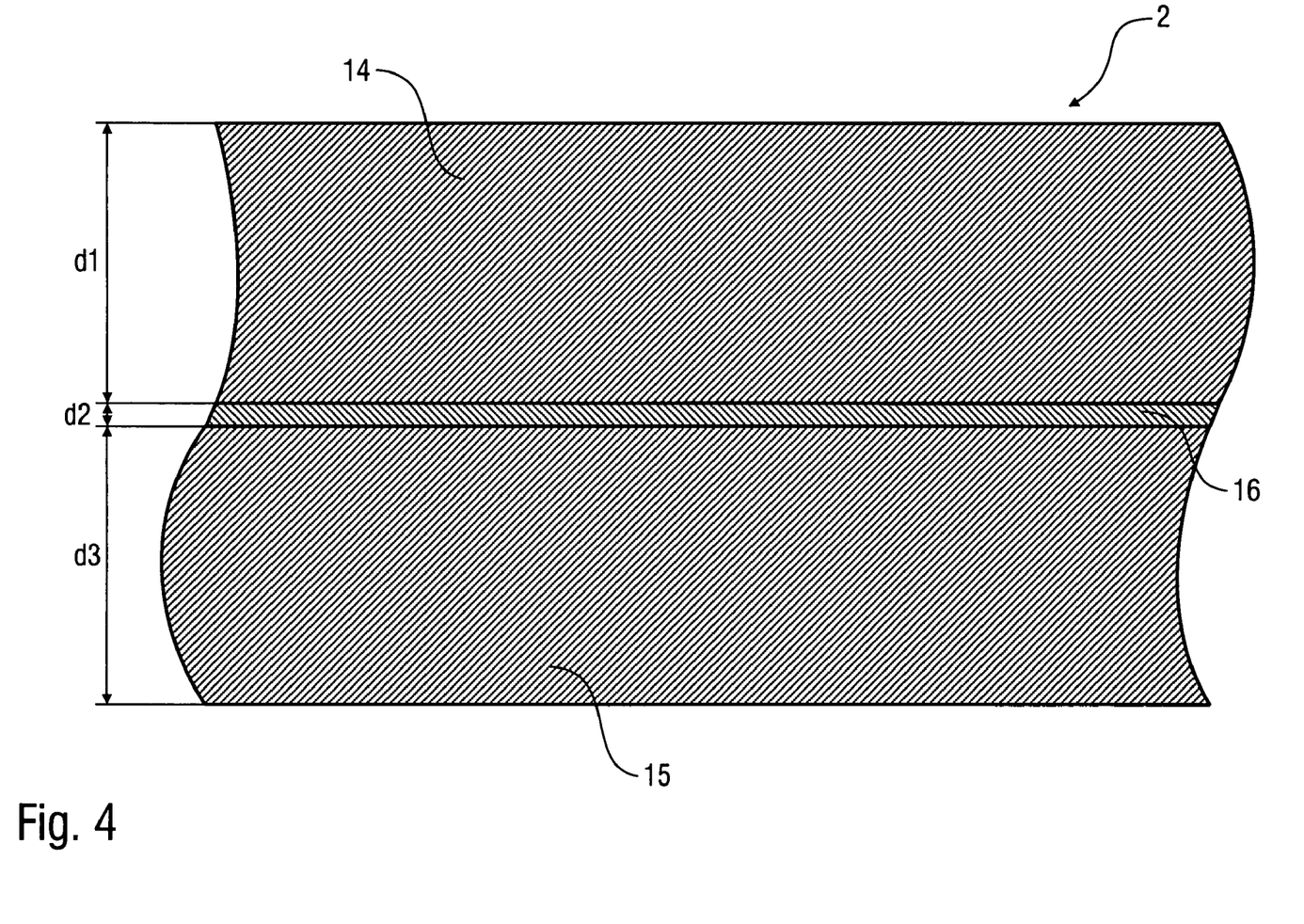

Finally, FIG. 3 shows a cross-section of the upper panel 2 which consists of an upper layer 14 and a lower layer 15 both made of CFRP. Further, a vibration damping foil 16 is sandwiched between the upper layer 14 and the lower layer 15 of the upper panel 2. It should further be noted that the lower panel 3 of the breadboard comprises a similar sandwich arrangement.

In this embodiment, the vibration damping foil 16 is a foil sold by the company 3M™ under the trademark 110™, wherein the foil 16 has a thickness of d2=0.05 mm. However, other types of vibration damping foils can be used instead of the foil 16.

The upper layer 14 has a thickness of at least d1=0.6 mm and the lower layer 15 has a thickness of at least d3=0.6 mm.

Various modifications and variations within the spirit and scope of the subject invention are apparent to those skilled in the art from the subject extensive disclosure.

The invention claimed is:

1. A breadboard for mounting components, comprising:
   a) an upper panel for mounting the components on top of the upper panel, wherein the upper panel consists of fiber reinforced plastics; and
   b) a lower panel being arranged substantially parallel to the upper panel at a specified distance below the upper panel, wherein the lower panel consists of fiber reinforced plastics; and
   c) several spacers being arranged between the upper panel and the lower panel,
      c1) wherein the spacers consist essentially of a fiber-reinforced material and
      c2) wherein the spacers are hollow tubes or massive rods which are aligned substantially perpendicular to the upper panel and the lower panel;
   d) several fixing elements for fixing the components to a top side of the upper panel,
      d1) wherein the fixing elements each comprise a head bearing on the top side of the upper panel, wherein a bottom side of the head is adhered to the top side of the upper panel;

d2) wherein the fixing elements each comprise a shaft which is introduced into the spacers, wherein an outer peripheral surface of the shaft is adhered to an inner surface of a spacer; and e) damping elements for damping mechanical vibrations of the breadboard, wherein the damping elements are attached to the spacers.

2. The breadboard according to claim 1, wherein at least one of the upper panel and the lower panel is a sandwich panel comprising:

a) an upper layer, b) a lower layer, and c) an intermediate layer being arranged between the upper layer and the lower layer, wherein the intermediate layer is adapted to damp mechanical vibrations stronger than the upper layer and the lower layer.

3. The breadboard according to claim 2, wherein at least one of the upper panel, the lower panel, and the spacer comprises a material comprising a thermal expansion coefficient of less than $10 \cdot 10^{-6} K^{-1}$.

4. The breadboard according to claim 1, wherein a) the fixing elements are raised relative to the top side of the upper panel, b) the fixing elements each comprise a screw having an internal thread for receiving an attachment screw of the corresponding component, and c) the fixing elements comprise a top surface which is leveled out by grinding or milling the top surface of the fixing elements.

5. The breadboard according to claim 1, further comprising several spacers spatially distributed between the upper panel and the lower panel, each connecting the upper panel to the lower panel, wherein the spacers have different vibration characteristics.

6. The breadboard according to claim 1, wherein a) the upper panel comprises a grid of fixing elements for fixing the components to the upper panel, b) the components are attached to the fixing elements, c) the components have different vibration characteristics, d) the breadboard comprises a grid of spacers between the upper panel and the lower panel, so that each of the components corresponds to one or more of the fixing elements and one or more of the spacers, e) the spacers have different vibration characteristics, f) the vibration characteristics of the spacers are adapted to the vibration characteristics of the corresponding components in such a way that the mechanical vibrations of the breadboard are minimized as to an amplitude of displacement.

7. The breadboard according to claim 1, wherein lower ends of the hollow tubes are open so that the hollow tubes are each forming a passage for dirt.

8. The breadboard according to claim 1, wherein the damping elements are viscous dampers, which are inserted into the hollow tubes.

9. The breadboard according to claim 1, wherein an interspace between the upper panel and the lower panel is laterally covered by a side wall.

10. A method for manufacturing a breadboard, comprising the following steps:

a) providing an upper panel for mounting components on top of the upper panel, wherein the upper panel consists of fiber reinforced plastics;

b) providing a lower panel, wherein the lower panel comprises fiber reinforced plastics;

c) mechanically connecting the upper panel to the lower panel by several spacers, so that the lower panel is arranged substantially parallel to the upper panel at a specified distance below the upper panel, c1) wherein the spacers are fiber-reinforced;

c2) wherein the spacers are hollow tubes which are aligned substantially perpendicular to the upper panel and the lower panel;

d) drilling bores through the breadboard;

e) inserting fixing elements into the bores at a top side of the breadboard on a side of the upper panel, wherein the fixing elements are adapted to receive the components, e1) wherein the fixing elements each comprise a head bearing on a top side of the upper panel, wherein a bottom side of the head is adhered to the top side of the upper panel, e2) wherein the fixing elements each comprise a shaft which is introduced into the spacers, wherein an outer peripheral surface of the shaft is adhered to an inner surface of a spacer; and f) attaching the fixing elements to the top side of the upper panel and to the spacers within the bores by adhesion.

11. The breadboard according to claim 1, wherein an interspace between the upper panel and the lower panel is laterally uncovered.

* * * * *